United States Patent Office 3,407,070
Patented Oct. 22, 1968

3,407,070
MANUFACTURE OF FARINACEOUS-BASED, AMYLOSE-CONTAINING FOOD PRODUCTS BY MEANS OF AN EXTRUSION TYPE PROCESS
Daniel G. Murray, Muscatine, Iowa, and Nicholas G. Marotta, Green Brook, and Richard M. Boettger, Morristown, N.J., assignors to National Starch and Chemical Corporation, New York, N.Y., a corporation of Delaware
No Drawing. Continuation-in-part of application Ser. No. 412,818, Nov. 20, 1964. This application June 26, 1967, Ser. No. 648,960
14 Claims. (Cl. 99—83)

ABSTRACT OF THE DISCLOSURE

Ready-to-eat food products and a method for their preparation which comprises admixing a farinaceous base with a high amylose starch product, moisturizing the resulting blend, subjecting it to the simultaneous action of heat, pressure and mixing in order to form the desired shape—retaining food product, and thereafter putting the food product into its final edible form by means of a suitable cooking operation.

Related application

This application is a continuation-in-part of our application Ser. No. 412,818, filed Nov. 20, 1964, and assigned to the assignee of the subject application.

Background of the invention

It is highly desirable that ready-to-eat food products based upon farinaceous materials possess certain properties of texture, taste and ease of manufacture. Thus, for example, such products should be produced by a process which permits their rapid solidification or setting, thereby enabling them to retain the shape in which they were initially prepared. They should have sufficient strength and rigidity to permit their being sliced or cut, if such an operation is required. Upon being put into edible form, such products should be crisp and should retain their crispiness over prolonged periods. They should not be unpleasantly tough and, of course, they should have an appealing flavor. Where frying of these food products is required, the absorption of excess quantities of oil during the frying step should be avoided and variations in the amount of oil absorbed should be reduced to a minimum. Color variations should be also be reduced to a minimum, while the shelf life of the products should be the maximum which is attainable.

Present recipes and means of production provide few, if any, special measures which are designed to insure the attainment of the above described properties of appearance, texture and taste. Thus such prior art products have not set rapidly, have not retained their desired shapes and have proved somewhat difficult to handle and cut. Furthermore, the taste of such prior art products has fluctuated as a result of the inherent variations present in the various natural base ingredients which have been used in their manufacture. The taste of such products has also necessarily reflected the flavor imparted by the cereal flour, notably corn flour, which is ordinarily utilized therein, thereby severely limiting the variability in taste and texture which the practitioner desires in making a variety of such ready-to-eat specialty food products.

Summary of the invention

It is thus, the prime object of this invention to prepare farinaceous-based, ready-to-eat food products which exhibit outstanding characteristics of taste, texture and appearance.

It is a further object to provide a method for the preparation of such products which insures the attainment of the latter characteristics.

Various other objects and advantages of this invention will become apparent from the following description thereof.

We have now found that when high amylose starch is used as part of the starch base component of the farinaceous based food products of this invention, all of the notable advantages previously described are realized. Thus, such products rapidly set immediately upon their emergence from the apparatus utilized in their manufacture. The latter factor increases the shape retention qualities of these products and results in firm products which can better withstand further treatments such as cutting, drying and frying. Furthermore, these products exhibit prolonged storage stability, limited oil absorption upon frying and controlled texture and taste characteristics.

As an example of the wide variety of specialty food products which may thus be prepared by means of the novel process of this invention, one may list crackers, chips, cereal puffs, and other so-called "snack" items; the latter products being available in a multiplicity of flavors and shapes.

Detailed description of the invention

It is well known that starch is composed of two fractions, one a branched fraction known as amylopectin, and the other a linear fraction known as amylose. Each starch type contains these two fractions in a specific ratio characteristic of that particular starch. Methods for separating starch into these two components are known. Furthermore, some starches have been genetically developed which are characterized by a large preponderance of the one fraction or the other.

When we use the term "amylose" or "amylose product" for the purposes of this invention, we refer to the amylose resulting from the fractionation of whole starch into its respective amylose and amylopectin components, or to whole starch which is composed of at least about 50%, by weight, of amylose. The amylose may be further treated as with heat and/or acids or with oxidizing agents to form so-called thin boiling products. In addition, the amylose may be chemically derivatized, as by means of an esterification reaction which would thus yield amylose esters such, for example, as the acetate, propionate and butyrate esters; or, by means of an etherification reaction which would thus yield amylose ethers such, for example, as the hydroxyethyl, hydroxypropyl, or carboxymethyl ethers.

Thus, according to our process, the above defined amylose products are thoroughly admixed with farinaceous bases and, in the presence of no more than about 50% moisture, based on the weight of the total composition, they are passed through an apparatus, preferably a heated extruder, which is capable of subjecting the mixture to a simultaneous combination of mixing, of sufficient heat and pressure to thoroughly hydrate the amylose product and sufficient pressure to force the resulting mass through a shaping orifice as a solid, formed, shape-retaining, farinaceous-based product. Depending upon the process conditions which are utilized, the product exiting from the shaping step may be in its ultimate edible form or it may merely need an additional cooking operation in order to be put into such final form.

Whenever the description of the process of this invention relates to the specific use, therein, of an extruder, it is to be understood that any other type of apparatus capable of functioning in a similar manner is also applicable for use in preparing the novel products of this invention.

When we speak herein of farinaceous bases, we refer to whole and comminuted tubers and whole or cracked cereal grains as well as flours and meals derived from the latter. The whole cereal grains may, in turn, be precooked or pretreated in order to obtain fast cooking products, typical procedures for achieving such fast cooking including passing an aqueous slurry of the grain over heated drums at temperatures which simultaneously gelatinize and dry it or the use of a chemical treatment with such reagents as disodium phosphate. In addition, conventional, i.e., low amylose, starches can be used as the farinaceous base material and are deemed, for purpose of this invention, to be included within the scope of the term "farinaceous." Such conventional starches, among which are included corn, tapioca, rice and waxy maize varieties, may be utilized in their raw form or, if desired, in a modified form, e.g., in a derivatized or inhibited form.

It should be noted, however, that none of the latter conventional starch materials can be employed in the complete absence of a high amylose product, as taught by our novel process, since the exclusive use of such conventional, low amylose starches results in the preparation of food products which display such defects as poor shaping, poor extrusion handling because of gummy texture and poor set, fragile texture and lack of crispiness when cooked.

The concentration of the amylose product which is present in the initial dry blend should be selected so as to insure a total amylose concentration therein of from about 5 to 60%, based on the total weight of solids in the blend; the total amylose concentration referring only to the amylose content of the amylose product and not to the amylose which is present in any conventional, low amylose starches that may serve as part of the farinaceous component of the dry blend. Amylose concentrations which fall below about 5%, by weight, result in the preparation of extruded products which tend to be gummy and of low rigidity, thereby making the shaping, cutting and handling of the extruded product extremely difficult. On the other hand, amylose concentrations which exceed about 60%, by weight, tend to make the extruded product exceedingly dense, thereby precluding the attainment of a porous, puffy appearance upon completing the preparation of these products.

The initial dry blend may, if desired, contain a wide variety of additives which serve to flavor, color, and/or stabilize, etc., the resulting farinaceous based food products. Among such extraneous additives are included: flavoring materials such as dried cheeses, dried fruits, nuts, pizza flavor, onion, garlic, sodium chloride, monosodium glutamate, sweeteners, pepper and paprika; coloring agents such as carotene; stabilizers and thickeners such as methyl cellulose and sodium caseinate; preservatives such as calcium propionate; plasticizers; antioxidants; and the like. It is to be noted that these additives may be present in our novel food products in only minor concentrations which usually do not exceed about 10%, based on the total weight of the dry ingredients. Although such additives are generally added to the initial dry blend, some may, if desired, be injected therein as the mass passes through the cooled section of the extruder barrel or die.

The amount of moisture in the extrusion mixture should be sufficient to hydrate the amylose and to gelatinize and disperse the farinaceous base under the particular extrusion conditions employed, taking into account the specific starch being used, the nature and proportions of the other ingredients, the temperature and pressure employed in the extrusion operation and the particular characteristics which are desired in the ultimate food product. Thus, concentrations of water ranging from about 15 to 50%, and preferably 20 to 40%, based on the total weight of the composition, are ordinarily used.

It should be noted that the moisture which may be inherently present in the various components of the composition is not included in determining the amount of water which is to be added to the dry blend. The condition of small amounts of water to the dry blend, i.e., less than about 25%, by weight, is usually accomplished by spraying, i.e., mixing the dry materials while spraying with water. When larger amounts of water are used, however, the dry blend is added to the water, which is under agitation, in order to form a viscous suspension. Where it is not desired to initially add the entire concentration of water to the mixture, the balance may be injected, as steam or as hot water, directly into the extruder.

The resulting mixture, which may be in the form of a dry or damp powder or a viscous suspension, may be slightly heated, if desired, although such heating is unnecessary in view of the fact that we depend solely upon the exertion of relatively high heat in the extruder barrel to hydrate the amylose and to swell, hydrate and paste the farinaceous materials. The latter moistened blend is then fed into the extruder by a pump, ram, double motion ribbon blender, or by any other suitable means.

For the extrusion step, one may employ any device capable of subjecting the mixture to the heat and pressure necessary to hydrate the amylose product and gelatinize the farinaceous base, preferably with some simultaneous shearing action, and to the pressure necessary to force the mixture through an orifice or multiplicity of orifices at the terminal end of the apparatus. Although we may thus use a batch type pressure cooker or a continuous type pressure conveyor-cooker in conjunction with a roller or similar shaping device, it is preferably to use an extruder which is capable of conducting all of the required operations in a single continuous procedure. The extruder is typically fitted with a cooking section whose temperature is capable of being regulated, a cooling system which is capable of reducing the temperature to below about 212° F., and an orifice or die which gives the product its final shape. A wide variety of orifice shapes may be used including, for example, straight or serrated slits, round or oval openings, fluted circular shapes and tubed openings, etc. It is also possible to extrude the product in the form of a ribbon or a thin sheet so that the desired shape of the individual pieces of the ultimate food product may be cut from the resulting ribbons and sheets.

The extruder may also be arranged so that the first section of its barrel contains heating elements which induce hydration and pasting of the starch materials, whereas the second section of the extruder barrel may be water-cooled so as to be able to remove a considerable amount of heat from the cooked mixture. Another variation consists in using two or more extruders in tandem, one to heat and the other to cool. In either instance, the combined heat, pressure and mixing action serve to effectively disperse the mixture, in spite of the relatively low amounts of moisture present.

The temperature within the extruder barrel depends upon the amount and type of starch present in the mixture as well as on the moisture content thereof. In order to realize the most favorable taste and color characteristics in the finished food product, the cooking temperature should be as low as possible, consistent with the need to hydrate the amylose product. Thus, typical barrel temperatures range from about 200° F. to 350° F.

The temperature of the extruder die will, in most instances, be kept within the range of from about 100° to 212° F., it being necessary to lower the temperature of the material in the extruder to below about 212° F. in order to avoid the escape of steam, i.e., to avoid flashing. The precise temperature within the above cited range that may be used is also directly related to the composition of the extruded mixture. As will be described hereinafter, the reduction in temperatures between the barrel and the die may be omitted where it is desired to utilize the flashing phenomenon in order to put the product into its final form without the need for a subsequent cooking operation.

The pressure utilized within the extrusion mechanism will vary with the type of extruder, the compression ratio and speed of the screw employed, the nature of the material being extruded, the construction of the die, the temperature being used and the amount of water present. Typical pressures thus range from about 50 to 1,000 p.s.i.

The necessity for allowing the resulting food product to set upon the conclusion of the extrusion operation is primarily dependent upon the concentration of water and the type and concentration of amylose product which is present in the food product as well as on the degree of cooling which is applied. Under optimum conditions, the end product will be extruded as a nontacky, shape-retaining mass which can be immediately cut at high speeds and which, on further cooling, will increase in rigidity. The ability to produce immediate shape-retaining properties may be further enhanced by chilling the product as it leaves the extruder or by moving it through a channel of refrigerated air.

Depending upon the recipe and the extrusion conditions being utilized, the resulting extruded composition may require an additional operation in order to be put into its final desired form of a fluffy, crisp, light textured food product. As previously noted, however, this final cooking operation may be conducted at the extruder die immediately after the exposure of the mixture to the simultaneous action of the heat, pressure and mixing. Thus, if the pressure-cooked product is not cooled upon approaching the extruder die but is, rather, maintained at the high cooking temperature which is encountered in the first section of the extruder, i.e., about 200 to 350° F., there will be a "flashing off," i.e., release of steam from the product as it emerges from the extruder die into a region of ambient temperatures and pressures; the latter release of steam thus serving to reduce the moisture content of the product as well as to puff, i.e., expand, crisp and color it.

On the other hand, an extruded product which emerges from a cooled extruder die may be put into edible form by being deep-fried. Thus, the product is first dried to a moisture content of about 12%, by weight, and then immersed in an edible cooking oil such, for example, as cottonseed, corn, coconut, soy, or any mixture of the latter oils, and cooked for a period of about ½ to 5 minutes at a temperature in the range of from about 300° to 400° F. The precise combination of time and temperature which are utilized for the deep frying operation will, of course, depend upon the particular product which is being prepared as well as the oil being utilized.

In addition, the uncooked products resulting from a typical extrusion procedure, i.e., where flashing off is not utilized, may be subjected to other cooking techniques, such as baking, which serve to reduce the moisture content of the products as well as to convert them into fluffy, crisp, light textured, tasty, ready-to-eat food products.

It is to be noted that the unique food products of this invention can only be adequately described by making reference to the process which has been utilized for their preparation.

The following examples will further illustrate the embodiment of our invention. In these examples, all parts given are by weight unless otherwise noted.

EXAMPLE I

This example illustrates the preparation of a typical ready-to-eat, farinaceous-based food product of this invention by means of an extrusion process; the latter product containing a high amylose starch intimately dispersed therein.

A dry mix comprising: (1) 5,000 parts of a waxy maize starch which had been inhibited and acetylated by treatment with 4.6%, by weight, of an adipic-acetic mixed anhydride containing one part of adipic acid and 50 parts of acetic anhydride according to the process set forth in Example II of U.S. Patent No. 2,935,510; and, (2) 5,000 parts of an acetate ester of a high amylose corn starch resulting from the treatment of a high amylose corn starch containing 55%, by weight, of amylose with 5%, by weight, of acetic anhydride, was thoroughly blended and then added, under agitation, to 10,500 parts of water. The mixture was then pumped into an extruder having a barrel length of 25″ and having a screw with a diameter of 1¼″ which rotated at a speed of 125 r.p.m. The barrel temperature of the extruder was maintained within a range of 245° to 250° F. and a pressure of from 80 to 200 pounds per square inch. The cooked material was then passed from the heated barrel into a cooled barrel consisting of a water cooled cylinder in which a ¾″ conveying screw moved the material in contact with the cold cylinder walls into a shaping die. The temperature of the material in the shaping die was about 125° F.

The solid, rope-like food product which emerged from the die exhibited excellent shape-retention properties and could readily be cut immediately after extrusion. These cut slices were thereupon dried, at room temperature, for a period of 16 hours and then deep-fried, for a period of 30 seconds, in corn oil which was at a temperature of 400° F. The resulting fried products were exceedingly tasty, crisp and light textured.

In contrast, when the above described procedures were utilized to prepare a food product which did not contain a high amylose starch intimately dispersed therein, the resulting extruded product exhibited an undesirable gummy, tacky appearance and, as a result, could not be readily cut immediately after its emergence from the extruder die.

EXAMPLE II

This example illustrates the wide variety of farinaceous base materials and amylose products which can be effectively utilized in preparing novel food products by means of the process of this invention.

The general procedures set forth in Example I, hereinabove, were utilized to prepare the food recipes described in the following table. Any additives which were included in these recipes were blended with the initial dry blend.

| Ingredients | Parts recipe # | | | | | |
|---|---|---|---|---|---|---|
| | 1 | 2 | 3* | 4 | 5 | 6 |
| A waxy maize starch which had been inhibited and acetylated with 4.6%, by weight, of an adipic-acetic mixed anhydride containing 1 part of adipic acid and 50 parts of acetic anhydride | | | | | 260 | 440 |
| Tapioca starch | | | | 400 | | |
| A waxy maize starch | | | | 400 | | |
| A bran-free, enriched, white wheat meal | 3,750 | | | | | |
| A whole wheat, quick cooking brown wheat meal | | | 500 | | | |
| An acetate ester of a high amylose corn starch resulting from the treatment of a high amylose corn starch containing 55%, by weight, of amylose with 5%, by weight, of acetic anhydride | 3,750 | 500 | | | 260 | 60 |
| A high amylose corn starch containing 55%, by weight, of amylose | | | | 600 | | |
| An acetate ester of a high amylose corn starch resulting from the treatment of a high amylose corn starch containing 70%, by weight, of amylose with 5%, by weight, of acetic anhydride | | | | | 600 | |

See footnote at end of table.

TABLE—Continued

| Ingredients | Parts recipe # | | | | | |
|---|---|---|---|---|---|---|
| | 1 | 2 | 3* | 4 | 5 | 6 |
| Dried cheese powder | | 100 | | | 51 | 105 |
| Onion powder | | 10 | | | 8 | 5 |
| Caraway seed | | 20 | | | | |
| Salt | | 30 | | | 22 | 22 |
| Paprika | | | | | 5 | |
| Pizza flavor | | | | | 2 | |
| Monosodium glutamate | | | | | | 2 |
| Water | 7,600 | 1,000 | 1,050 | 1,000 | 392 | 366 |

*The aqueous dispersion in this recipe was heated to 330° F., prior to extrusion and cooled to 150° F. during the cooling cycle of the extrusion procedure.

In each instance, the resulting food product exhibited a shape-retaining configuration which could be readily sliced. Thereafter, Recipes #2, #5 and #6 were dried and deep fried in corn oil which was at a temperature of 400° F. and cooked therein for a period of 30 seconds. The resulting fried products were exceedingly crispy and tasty.

EXAMPLE III

This example illustrates the necessity for utilizing the specified concentration of high amylose starch in order to prepare the outstanding food products of this invention.

The recipes which are described in the following table were prepared according to the procedures set forth in Example I, hereinabove. The resulting products were then rated on the basis of their appearance and their ease of cutting immediately after emerging from the cooled section of the extruder as well as on the basis of their appearance and taste after deep-frying.

| Ingredients | Parts recipe # | | | | | |
|---|---|---|---|---|---|---|
| | 1 | 2 | 3 | 4 | 5 | 6 |
| A bran-free, enriched, white wheat meal. | 1,500 | 1,350 | 1,124 | 750 | 376 | 150. |
| An acetate ester of a high amylose corn starch resulting from the treatment of a high amylose corn starch containing 55%, by weight, of amylose with 5%, by weight, of acetic anhydride. | 0 | 150 | 376 | 750 | 1,124 | 1,350. |
| Water | 1,550 | 1,550 | 1,155 | 1,155 | 1,155 | 1,550. |
| Total amylose content percent, by weight). | 0 | 5.5 | 13.75 | 27.5 | 40.25 | 49.5. |
| Appearance after extrusion | Very sticky and rubbery. | Sticky and rubbery. | Slightly sticky and rubbery. | Firm and shape-retaining. | Firm and shape-retaining. | Firm and shape-retaining. |
| Ease of cutting | Poor | Fair | Good | Excellent | Excellent | Excellent. |
| Characteristics after deep-frying. | Tough | Porous, good taste. | Light textured, porous, good taste. | Light textured, porous, good taste. | Good taste, slightly tough and less porous. | Medium toughness and density. |

The data summarized above clearly indicate the necessity for adhering to the previously specified minimum high amylose concentration in order to obtain food products which exhibit optimum properties both after extrusion operation and after the deep-frying process.

Summarizing, the novel process of this invention may thus be said to result in the preparation of farinaceous-based, ready-to-eat food products having vastly improved properties as compared with the results heretofore attainable.

Variations may be made in proportions, procedures and materials without departing from the scope of this invention which is defined by the following claims.

What is claimed is:

1. A process for preparing a farinaceous-based food product which comprises the steps of: (1) moisturizing a blend of a farinaceous base and an extraneously added amylose product so that the amylose concentration of said blend which is derived exclusively from the extraneously added amylose product is from about 5 to 60% based on the total weight of the blend; (2) subjecting said moisturized blend to simultaneous heat, pressure and mixing action to effect the hydration of the amylose product and the gelatinization of the farinaceous base with the simultaneous mixing and mastication of said blend; (3) shaping said blend from said mixing; and (4) cooking said shaped blend thereby obtaining an edible product that is characterized by its fluffiness, crispiness and light texture; said cooking procedure being conducted at a point in time simultaneous with or directly subsequent to the shaping of said material from the mixing.

2. The process of claim 1, wherein the amylose concentration of said blend which is derived exclusively from the amylose product is from about 5 to 60%, based on the total weight of the blend.

3. The process of claim 1, wherein said blend is moisturized with from about 15 to 50% of water, based on the total weight of the resulting moisturized blend.

4. The process of claim 1, wherein said moisturized blend is initially subjected, in mixing, to a temperature of from about 200° to 350° F. and thereafter subjected, in shaping, to a temperature of from about 100 to 212° F. while the pressure to which said moisturized blend is subjected, in mixing and shaping is in the range of from about 50 to 1,000 pounds per square inch.

5. The process of claim 4, wherein said cooking procedure, subsequent to the expulsion of said blend from said shaping, is conducted in a hot, edible, cooking oil.

6. A process for preparing a farinaceous-based food product which comprises the steps of (1) moisturizing a blend of a farinaceous base and an extraneously added amylose product so that the amylose concentration of said blend which is derived exclusively from the extraneously added amylose product is from about 5 to 60% based on the total weight of the blend; (2) subjecting said moisturized blend to simultaneous heat, pressure and mixing action to effect the hydration of the amylose product and the gelatinization of the farinaceous base with the simultaneous mixing and mastication of said blend; (3) shaping said blend from said mixing; and (4) cooking said shaped blend thereby obtaining an edible product that is characterized by its fluffiness, crispiness and light texture; said cooking procedure being conducted at a point in time simultaneous with or directly subsequent to the shaping of said material from the mixing, and wherein the pressure and the temperature to which said moisturized blend is subjected in both the mixing and shaping of steps 2 and 3 are maintained in the range of from about 50 to 1,000 pounds per square inch and from about 200 to 350° F., respectively; maintaining the latter elevated temperatures of the blend in the shaping thereby effecting the release of steam from the moisturized blend as it emerges from the shaping into a region of ambient temperatures and pressure; the latter release of steam thus serving as the cooking step which is required for rendering the final product substantially fluffy, crisp, and light textured.

7. The process of claim 1, wherein said farinaceous base is a waxy maize starch which has been inhibited and acetylated with 4.6%, by weight, of an adipic-acetic mixed anhydride containing one part of adipic acid and 50 parts of acetic anhydride, and wherein said amylose product is an acetate ester of a high amylose corn starch containing 55%, by weight, of amylose.

8. A process for preparing a farinaceous-based food product which comprises the steps of: (1) moisturizing a blend of a farinaceous base and an extraneously added amylose product so that the amylose concentration of said blend which is derived exclusively from the extraneously added amylose product is from about 5 to 60% based on the total weight of the blend; (2) subjecting said moisturized blend to the simultaneous heat, pressure and mixing action of an extruder to effect the hydration of the amylose product and the gelatinization of the farinaceous base with the simultaneous mixing and mastication of said blend; (3) expelling said blend from the extruder; and, (4) cooking said extruded material thereby obtaining an edible product that is characterized by its fluffiness, crispiness and light texture; said cooking procedure being conducted at a point in time simultaneous with or subsequent to the expulsion of said material from the extruder die.

9. The process of claim 8, wherein said blend is moisturized with from about 15 to 50% of water, as based on the total weight of the resulting moisturized blend.

10. The process of claim 8, wherein said moisturized blend is initially subjected, in the extruder barrel, to a temperature of from about 200 to 350° F. and thereafter subjected, in the extruder die, to a temperature of from about 100 to 212° F. while the pressure to which said moisturized blend is subjected, in both the barrel and the die of said extruder, is in the range of from about 50 to 1,000 p.s.i.

11. The process of claim 10 wherein said cooking procedure, subsequent to the expulsion of said blend from said extruder die, is conducted in a hot, edible, cooking oil.

12. A process for preparing a farinaceous-based food product which comprises the steps of: (1) moisturizing a blend of a farinaceous base and an extraneously added amylose product in the amount of 5 to 60% of the blend; (2) subjecting said moisturized blend to the simultaneous heat, pressure and mixing action of an extruder to effect the hydration of the amylose product and the gelatinization of the farinaceous base with the simultaneous mixing and mastication of said blend; (3) expelling said blend from the extruder; and, (4) cooking said extruded material thereby obtaining an edible product that is characterized by its fluffiness, crispiness and light texture; said cooking procedure being conducted at a point in time simultaneous with or subsequent to the expulsion of said material from the extruder die, and wherein the pressure and the temperature to which said moisturized blend is subjected in both the barrel and the die of said extruder are in the range of from about 50 to 1,000 p.s.i. and from about 200 to 350° F., respectively; the maintenance of the blend at the latter elevated temperatures in said apparatus thereby effecting the release of steam from the moisturized blend as it emerges from said apparatus into a region of ambient temperatures and pressures; the latter release of steam thus serving as the cooking step which is required for rendering the final product substantially fluffy, crisp and light textured.

13. The process of claim 12, wherein said farinaceous base is a waxy maize starch which has been inhibited and acetylated with 4.6%, by weight, of an adipic-acetic mixed anhydride containing one part of adipic acid and 50 parts of acetic anhydride, and wherein said amylose product is an acetate ester of a high amylose corn starch containing 55%, by weight, of amylose.

14. A farinaceous-based cooked food product produced by the process of claim 1.

References Cited
UNITED STATES PATENTS

| | | | |
|---|---|---|---|
| 3,027,258 | 3/1962 | Markakis et al. | 99—100 |
| 3,052,545 | 9/1962 | Ducharme et al. | 99—94 X |
| 3,076,711 | 2/1963 | Gerkens | 99—100 |

ALVIN E. TANENHOLTZ, *Primary Examiner.*

D. M. NAFF, *Assistant Examiner.*